United States Patent
Liao et al.

(10) Patent No.: US 11,735,195 B2
(45) Date of Patent: Aug. 22, 2023

(54) SIGNAL TRANSMISSION METHOD AND APPARATUS FOR TRANSMISSION OF DATA OVER AUDIO TRANSMISSION INTERFACE

(71) Applicant: Realtek Semiconductor Corp., HsinChu (TW)

(72) Inventors: Chun-Ku Liao, HsinChu (TW); Chia-Che Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 24 days.

(21) Appl. No.: 17/355,117

(22) Filed: Jun. 22, 2021

(65) Prior Publication Data
US 2022/0068286 A1 Mar. 3, 2022

(30) Foreign Application Priority Data
Aug. 26, 2020 (TW) .................... 109129152

(51) Int. Cl.
*H04B 3/00* (2006.01)
*G10L 19/16* (2013.01)
*G06F 3/16* (2006.01)
*G10L 19/008* (2013.01)

(52) U.S. Cl.
CPC ............ *G10L 19/167* (2013.01); *G06F 3/162* (2013.01); *G06F 3/167* (2013.01); *G10L 19/008* (2013.01)

(58) Field of Classification Search
CPC ............................ H04B 3/00; H04R 2227/005
USPC ........................................................... 381/77
See application file for complete search history.

(56) References Cited

U.S. PATENT DOCUMENTS

| | | | | |
|---|---|---|---|---|
| 5,173,900 A | * | 12/1992 | Miller | H04N 21/2389 380/240 |
| 7,176,373 B1 | * | 2/2007 | Longo | G10H 1/057 84/622 |
| 2003/0059057 A1 | * | 3/2003 | Cheng | H04S 3/00 381/61 |
| 2008/0043823 A1 | * | 2/2008 | Lin | H04L 25/4904 375/220 |
| 2015/0319354 A1 | * | 11/2015 | Ichikawa | H04N 5/765 348/211.2 |

* cited by examiner

*Primary Examiner* — George C Monikang
(74) *Attorney, Agent, or Firm* — Winston Hsu

(57) ABSTRACT

The present invention provides a signal transmission method for data transmission through an audio transmission interface. The method includes: receiving audio data and first control data that is generated based on at least one first human-machine interaction; packing the audio data into at least one first data unit; packing the first control data into at least one second data unit; and transmitting a bit stream including the first data unit and the second data unit at a transmission rate that is higher than a sampling rate of the audio data.

12 Claims, 4 Drawing Sheets

| B | Data1 | X 1 | W | Data2 | X 1 | M | Data3 | X 1 | W | Data4 | X 1 | M | Data5 | X 1 | W | Data6 | X 1 |
|---|---|---|---|---|---|---|---|---|---|---|---|---|---|---|---|---|---|
| SF1 | | | SF2 | | | SF3 | | | SF4 | | | SF5 | | | SF6 | | |

FIG. 3

SIGNAL TRANSMISSION METHOD AND APPARATUS FOR TRANSMISSION OF DATA OVER AUDIO TRANSMISSION INTERFACE

BACKGROUND OF THE INVENTION

1. Field of the Invention

The present invention relates to communication transmission, and more particularly to a signal transmission method and apparatus for data transmission on an audio transmission interface.

2. Description of the Prior Art

Human-machine interface (HMI) refers to software/hardware that provides an interactive means between a user and a system, such as a computer/electronic system or a mechanical system. With the development of technology, today's electronic equipment often integrates many different types of human-machine interaction devices, such as: key input, voice input, touch input, etc., but this also leads to diversification of signal transmission interfaces and an increase in the complexity of signal transmission.

SUMMARY OF THE INVENTION

In view of above, different types of human-machine interaction devices may have different signal transmission standards, such as connector types, transmission line types, and even data formats, which make the design of system transmission interface more complicated. Therefore, the present invention provides a signal transmission apparatus and related method, which can transmit signals generated by different types of human-machine interactions in the form of digital audio signals. Specifically, information generated by interactions, such as keyboard/button press, mouse control, microphone voice input, and/or touch control operation will be packed into digital audio transmission data units and transmitted through a digital audio transmission interface. Therefore, the present invention effectively reduces the complexity of the transmission interfaces. Moreover, the present invention also effectively controls data sampling rate and transmission rate of bit stream, and transmits audio information and control information having different sampling rates at the same time, thereby ensuring transmission efficiency and reliability.

According to one embodiment, a method for data transmission through an audio transmission interface is provided. The method comprises: receiving audio data and first control data that is generated based on at least one first human-machine interaction; packing the audio data into at least one first data unit; packing the first control data into at least one second data unit; and transmitting a bit stream including the first data unit and the second data unit at a transmission rate that is higher than a sampling rate of the audio data.

According to one embodiment of the present invention, a signal transmission apparatus for data transmission through an audio transmission interface is provided. The signal transmission apparatus comprises: a receiving unit, a data unit generator and a transmitting unit. The receiving unit is arranged to receive audio data and first control data that is generated based on at least one first human-machine interaction. The data unit generator is coupled to the receiving unit, and arranged to pack the audio data into at least one first data unit, and pack the first control data into at least one second data unit. The transmitting unit is coupled to the data unit generator, and arranged to transmit a bit stream including the first data unit and the second data unit at a transmission rate that is higher than a sampling rate of the audio data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates a bit stream generated by a data unit generator according to one embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
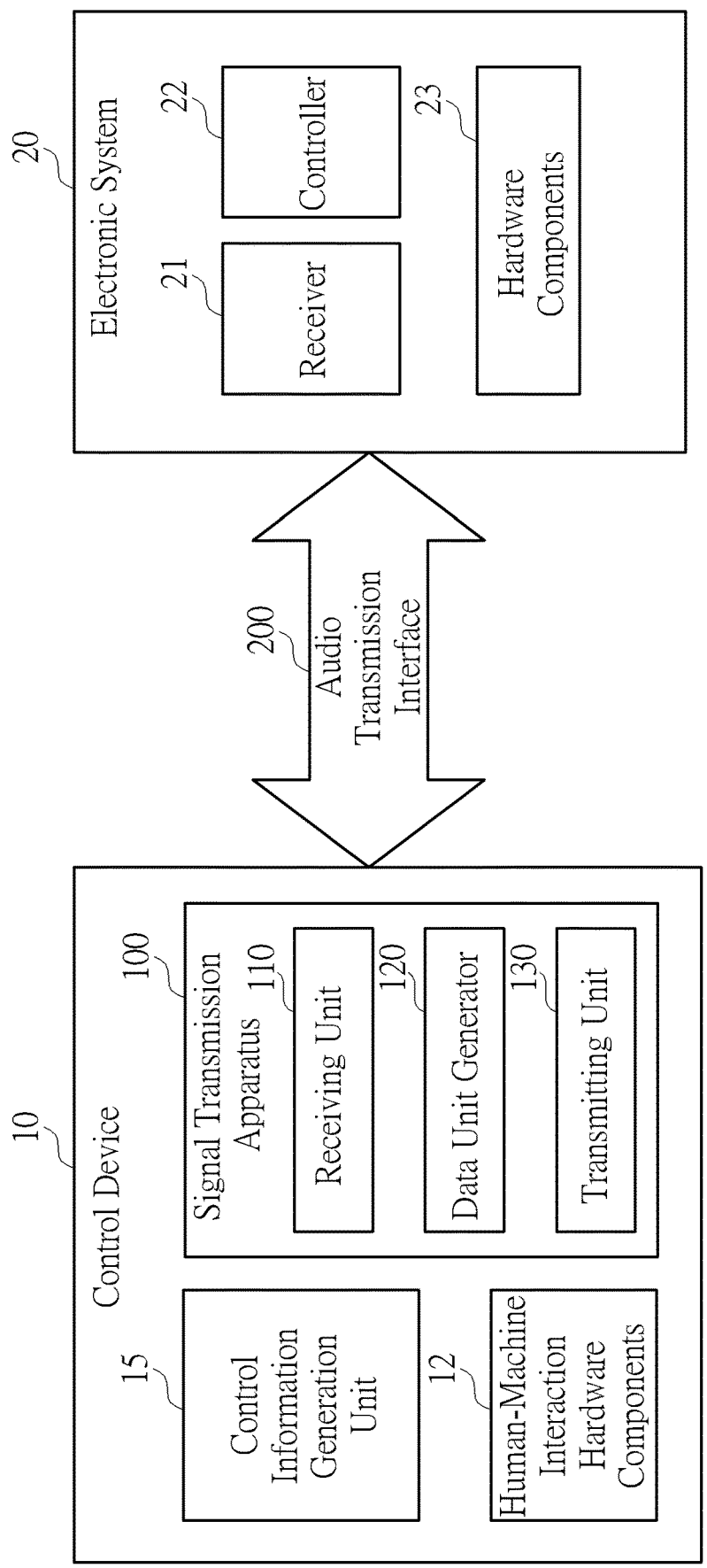
FIG. 1 illustrates a schematic diagram of an application of a signal transmission apparatus according to one embodiment of the present invention.

FIG. 1 illustrates a schematic diagram of an application of a signal transmission apparatus for data transmission over an audio transmission interface according to one embodiment of the present invention. As shown in the figure, a control device 10 is coupled to an electronic system 20 through an audio transmission interface 200, and arranged to transmit various different types of information on the audio transmission interface 200 to control the electronic system 20. In one embodiment, the control device 10 may be a personal computer, a laptop, or various types of user controllers, such as a remote controller, whose function is to provide one or more human-machine interaction means, so as to render the user's control over the electronic system 20. According to different embodiments of the present invention, the control device 10 may include one or more human-machine interaction hardware components 12, such as, a keyboard, buttons, a mouse, a microphone, or a touch panel for sensing user's control behavior. Furthermore, the electronic system 20 may be a set-up box, a smart TV, and/or a multimedia playback device. The electronic system 20 further includes a receiver 21, a controller 22 and hardware components 23. Specifically, the receiver 21 receives signals transmitted by the control device 10 through the audio transmission interface 200, accordingly performs corresponding demodulation/decoding operations to obtain control information sent by the control device 10, and sends it to the controller 22 to perform control over the hardware components 23. In one embodiment, the audio transmission interface 200 is a Sony/Philips Digital Interface Format (S/PDIF) interface.

A function of the signal transmission apparatus 100 of the present invention is to convert the control information generated by the control device 10 into a data format that conforms to a communication protocol of the audio transmission interface 200 and accordingly transmit the control information to the electronic system 20. As shown in the figure, the signal transmission apparatus 100 includes a receiving unit 110, a data unit generator 120, and a transmitting unit 130. The control device 10 may include a control information generating unit 15. The control information generating unit 15 is arranged to generate information that corresponds to human-machine interactions performed by the user on the one or more human-computer interaction hardware components 12, such as pressing the keyboard/buttons, operating the mouse, having touching control on the touch panel, and giving voice instructions through the microphone. These human-machine interactions will be detected and quantized by the control information generating unit 15 and then converted into digital signals. Accordingly, these digital signals are sent to the receiving unit 110 of the signal transmission apparatus 100 of the present invention. The receiving unit 110 transmits the control information provided by the control information generating unit 15 to the data unit generator 120.

The data unit generator 120 is arranged to generate data units that conforms to the communication protocol of the audio transmission interface 200, where the data units could be a frame or a sub-frame. The data unit may contain various fields, such as audio data fields for transmitting audio information, and auxiliary data fields for transmitting auxiliary information. The information in the auxiliary data field may include metadata indicating a sampling rate and a compression status of the audio information. According to various embodiments, the data unit generator 120 may pack the control information that is generated based on human-machine interactions and received by the receiving unit 110, into audio data fields and/or auxiliary data fields.

Figure 2:
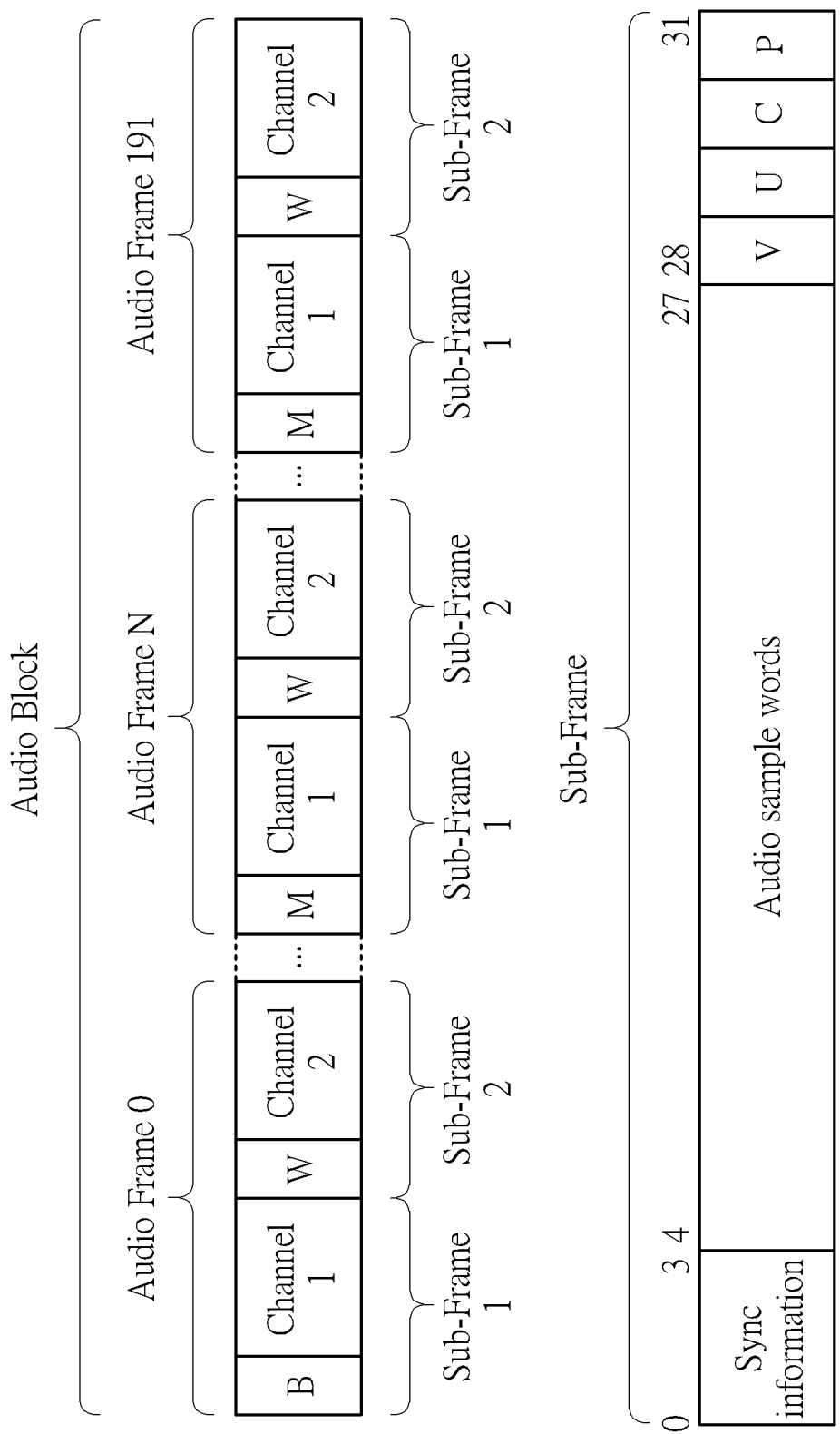
FIG. 2 illustrates a data unit used for signal transmission according to one embodiment of the present invention.

In the following description, the S/PDIF interface and related communication protocol will be taken as examples to elaborate specific operations and principles of the signal transmission apparatus 100 and a corresponding method of the present invention. However, those of ordinary skill in the art should be able to apply the concept of the present invention to other types of audio transmission interfaces after fully appreciating the specification. Such alternative implementations should fall within the scope of the present invention. Please refer to an S/PDIF data transmission format shown in FIG. 2. In the S/PDIF communication protocol, each audio block includes 192 frames, and each frame includes two sub-frames corresponding to different audio channels. Furthermore, each sub-frame contains 32-bit long data, wherein the first 4 bits are used to record information required for synchronization, including three different types, B, M, and W. The B, M, and W respectively indicate a beginning of an audio block, and different audio channels. Furthermore, the next 24 bits are an audio data field used to record an audio sample word. The last 4 bits include U/V/C fields used to record metadata of the audio data, and a P field used to record parity information. When the signal transmission apparatus 100 of the present invention is implemented with the S/PDIF interface, the data unit generator 120 may selectively enter control information into audio sample word fields and/or U/V/C fields, based on characteristics (e.g. data amount and sampling rate) of the control information that is intended to be transmitted.

The data unit generator 120 transmits the generated data units (such as a sub-frame) to the transmitting unit 130. The transmitting unit 130 transmits these data units to the electronic system 20 through the audio transmission interface 200 in the form of a bit stream. In order to have null/spare fields in the data units, the transmitting unit 130 transmits the bit stream at a rate higher than the sampling rate of the audio data. As such, the information about human-machine interactions can be transmitted with the null/spare fields. In one embodiment, if the sampling rate of the audio data is 16 kHz, the transmission unit 130 may transmit the bit stream at a rate of 48 kHz. In this way, there will be null/spare fields in each the data unit, such that the information about human-machine interactions can be transmitted during each transmission.

FIG. 3 illustrates a plurality of consecutive data units generated by the data unit generator 120 according to one embodiment of the present invention. As shown in the figure, the data unit generator 120 writes audio data into audio data fields Data1-Data4 of data units SF1-SF4. Furthermore, the data unit generator 120 writes first control data CNT1 into audio data fields Data5-Data6 of data units SF5-SF6, and writes second control data CNT2 into auxiliary data fields X1 of the data units SF1-SF6. In one embodiment, a sampling rate of the first control data CNT1 is lower than a transmission rate of the bit stream transmitted by the transmission unit 130, and a sampling rate of the second control data CNT2 is higher than the transmission rate of the bit stream transmitted by the transmission unit 130. In one embodiment, the first control data CNT1 may be the control information generated by the control information generating unit 15 in accordance with the user's touch control operation upon a touch panel (not shown) of the human-machine interaction hardware components 12. Furthermore, the second control data CNT2 may be the control information generated by the control information generating unit 15 based on the user's control operation on the keyboard, the buttons or the mouse of the control device 10, which intends to control the hardware components 23 of the electronic system 20. For example, the second control data CNT2 could be related to an infrared signal (IrDA) or a pulse width modulation signal used to control a light-emitting diode (not shown) in the hardware components 23 of the electronic system 20.

In various embodiments of the present invention, more than one types of first control data CNT1 may be packed into the audio data field of different data units, and more than one types of second control data CNT2 may be packed into the auxiliary data fields of different data units. The first control data CNT1 may have a relatively lower sampling rate and a relatively higher amount of data compared to the second control data CNT2. In addition, according to various embodiments, the data unit generator 120 may add only one type of control data to the consecutive data units. For example, only the first control data CNT1 or only the second control data CNT2 is added to the consecutive data units, which depends on the control information that the control device 10 intends to transmit.

Figure 4:
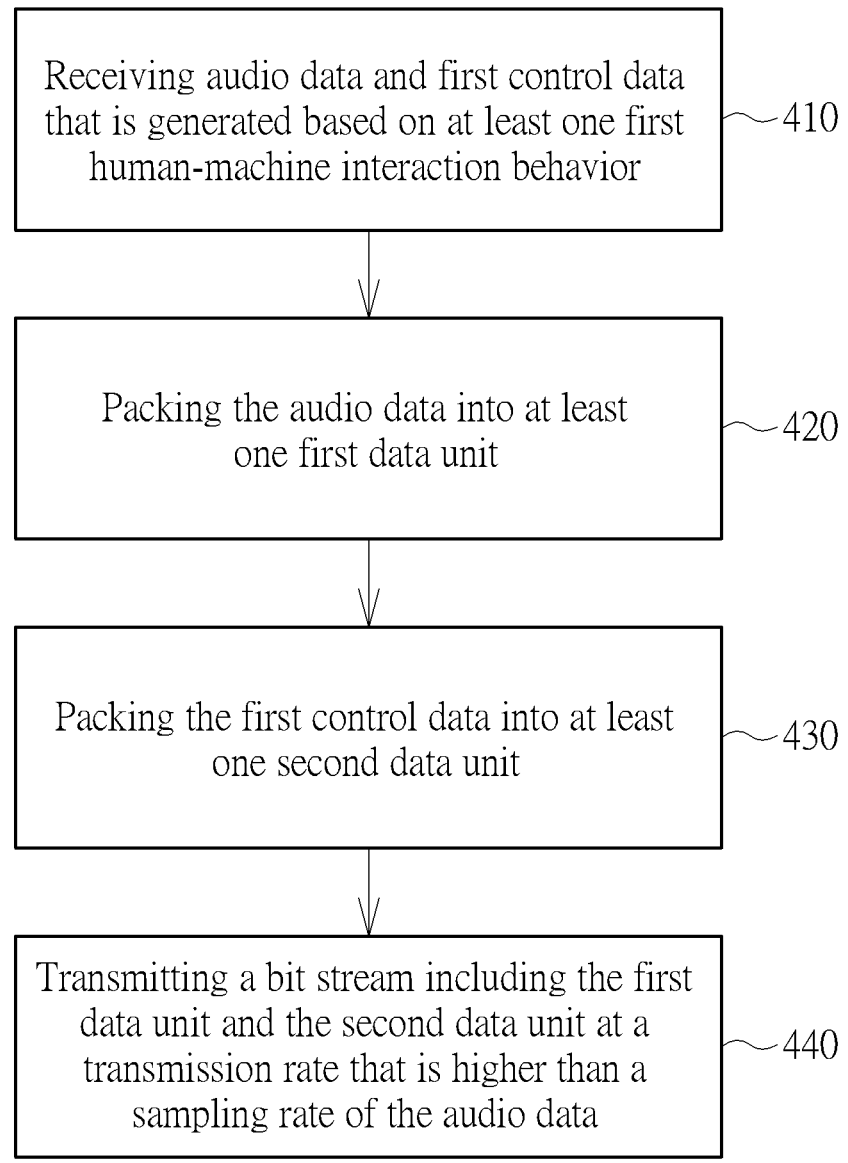
FIG. 4 illustrates a flowchart of a signal transmission method according to one embodiment of the present invention.

FIG. 4 illustrates a flowchart of a method for data transmission over an audio transmission interface according to one embodiment of the present invention. As shown in the figure, the method of the present invention includes the following step:

STEP 410: receiving audio data and first control data that is generated based on at least one first human-machine interaction;

STEP 420: packing the audio data into at least one first data unit;

STEP 430: packing the first control data into at least one second data unit;

STEP 440: transmitting a bit stream including the first data unit and the second data unit at a transmission rate that is higher than a sampling rate of the audio data.

As principles and specific details of the above steps have been described in detail with the embodiments of the signal transmission apparatus 100, further description regarding the above steps will not be repeated here. It should be noted that it is possible to improve the signal transmission method of the present invention by adding other additional steps to the above-mentioned flow.

In conclusion, the present invention packs control information generated by different types of human-machine interaction devices, such as keyboard/button press, mouse control, voice input on the microphone, and/or touch control operation, into data units of digital audio data transmission and transmitted through the digital audio transmission interface. In view of this, the present invention effectively reduces complexity of transmission interfaces. Furthermore, the present invention also controls the data sampling rate and the transmission rate of the bit stream, thereby to transmit audio information and control information having different sampling rates at the same time, such that transmission efficiency and reliability can be ensured.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data transmission through an audio transmission interface, comprising:
   receiving audio data that corresponds to multiple audio channels and first control data that is generated based on at least one first human-machine interaction;
   packing the audio data into an audio data field of at least one first audio frame;
   packing the first control data into an audio data field or an auxiliary data field of at least one second audio frame depending on a sampling rate of the first control data; and
   transmitting a bit stream including the first audio frame and the second audio frame at a transmission rate that is higher than a sampling rate of the audio data;
   wherein the audio transmission interface has only one data channel; and the first audio frame and the second audio frame are transmitted through the same data channel of the audio transmission interface.

2. The method of claim 1, wherein the step of packing the first control data into the second audio frame comprises:
   packing the first control data in the audio data field of the second audio frame, wherein the sampling rate of the first control data is identical to a sampling rate of the audio data.

3. The method of claim 1, wherein the step of packing the first control data into the second audio frame comprises:
   packing the first control data in the auxiliary data field of the second audio frame, wherein the sampling rate of the first control data is higher than a sampling rate of the audio data.

4. The method of claim 1, further comprising:
   receiving second control data that is generated based on a second human-machine interaction; and
   packing the second control data into an audio data field or an auxiliary data field of one of the first audio frame and the second audio frame depending on a sampling rate of the second control data.

5. The method of claim 1, wherein the first human-machine interaction includes at least one of pressing a button of a controller, using a microphone for voice input, and using a touch panel for touch control operation.

6. The method of claim 1, wherein the audio transmission interface is a Sony/Philips digital interface format (S/PDIF) interface.

7. A signal transmission apparatus for data transmission through an audio transmission interface, comprising:
   a receiving unit, arranged to receive audio data that corresponds to multiple audio channels and first control data that is generated based on at least one first human-machine interaction;
   a data unit generator, coupled to the receiving unit, arranged to pack the audio data into an audio data field of at least one first audio frame, and pack the first control data into an audio data field or an auxiliary data field of at least one second audio frame depending on a sampling rate of the first control data; and a transmitting unit, coupled to the data unit generator, arranged to transmit a bit stream including the first audio frame and the second audio frame at a transmission rate that is higher than a sampling rate of the audio data;

wherein the audio transmission interface has only one data channel; and the first audio frame and the second audio frame are transmitted through the same data channel of the audio transmission interface.

8. The signal transmission apparatus of claim 7, wherein the data unit generator is arranged to pack the first control data in the audio data field of the second audio frame, wherein the sampling rate of the first control data is identical to a sampling rate of the audio data.

9. The signal transmission apparatus of claim 7, wherein the data unit generator is arranged to pack the first control data in the auxiliary data field of the second audio frame, wherein the sampling rate of the first control data is higher than a sampling rate of the audio data.

10. The signal transmission apparatus of claim 7, wherein the receiving unit is further arranged to receive second control data that is generated based on a second human-machine interaction, and the data unit generator is arranged to pack the second control data into an audio data field or an auxiliary data field of one of the first audio frame and the second audio frame depending on a sampling rate of the second control data.

11. The signal transmission apparatus of claim 7, wherein the first human-machine interaction includes at least one of pressing a button of a controller, using a microphone for voice input, and using a touch panel for touch control operation.

12. The signal transmission apparatus of claim 7, wherein the audio transmission interface is a Sony/Philips digital interface format (S/PDIF) interface.

* * * * *